US008577659B2

(12) United States Patent
Kim et al.

(10) Patent No.: US 8,577,659 B2
(45) Date of Patent: Nov. 5, 2013

(54) METHOD FOR SIMULATING DISPERSED BUBBLE FLOW

(75) Inventors: Doyub Kim, Seoul (KR); Oh-Young Song, Seoul (KR); Hyeong-Seok Ko, Seoul (KR)

(73) Assignee: Seoul National University (KR)

( * ) Notice: Subject to any disclaimer, the term of this patent is extended or adjusted under 35 U.S.C. 154(b) by 382 days.

(21) Appl. No.: 12/870,540

(22) Filed: Aug. 27, 2010

(65) Prior Publication Data
US 2012/0053908 A1  Mar. 1, 2012

(51) Int. Cl.
*G06G 7/48* (2006.01)
*G06G 7/50* (2006.01)

(52) U.S. Cl.
USPC .................................. 703/9; 703/6

(58) Field of Classification Search
USPC ........................................ 703/9, 6
See application file for complete search history.

(56) References Cited

U.S. PATENT DOCUMENTS 7,349,833 B2 *  3/2008  Yu ...................................... 703/9

OTHER PUBLICATIONS

Kim, "Application of a Fractional-Step Method to Incompressible Navier-Stokes Equations", 1985, Academic Press, Inc, 16 pages.*
Marchandise, "A stabilized finite element method using a discontinuous level set approach for solving two phase incompressible flows", 2006, Journal of Computational Physics 219 (2006) 780-800, 21 pages.*
Bunner, "Direct numerical simulations of three-dimensional bubbly flows", Physics of Fluids, vol. 11 No. 8, Aug. 1999, 3 pages.*
LeVeque, "Cartesian Grid Methods for Fluid Flow in Complex Geometries", 1999, 25 pages.*
Stock, "Summary of Vortex Methods Literature", 2007, 115 pages.*

* cited by examiner

*Primary Examiner* — David Silver
(74) *Attorney, Agent, or Firm* — John K. Park; Park Law Firm

(57) ABSTRACT

A simple and efficient method for simulating dispersed bubble flow is provided. Instead of modeling the complex hydrodynamics of numerous small bubbles explicitly, the method approximates the average motion of these bubbles using a continuum multiphase solver. The subgrid interactions among bubbles are computed using a new stochastic solver. Using the proposed scheme, complex scenes with millions of bubbles can be simulated efficiently.

13 Claims, 3 Drawing Sheets

METHOD FOR SIMULATING DISPERSED BUBBLE FLOW

BACKGROUND OF THE INVENTION

The present invention relates to a method for simulating dispersed bubble flow.

SUMMARY OF THE INVENTION

The present invention contrives to solve the disadvantages of the prior art.

An aspect of the invention provides a method for simulating dispersed bubble flow.

The method comprises steps of:
representing gas and liquid volumes using a level set surface on a grid mesh comprising a plurality of cells;
representing a plurality of dispersed bubbles with a plurality of spherical particles;
modeling a gas-liquid dynamics by assuming viscous incompressible two-phase flow, wherein the gas-liquid dynamics is governed by an incompressible Navier-Stokes equation and a mass conservation equation;
converting a level set field to a fraction field using a Heaviside function;
discretizing a pressure Poisson equation;
computing pressure and viscosity for surrounding faces between two neighboring grid cells;
advecting bubble particles according to velocity field;
modeling bubble-bubble interactions as a discrete random walk and determining a direction of a bubble using a Schlick phase function;
updating states of the plurality of bubbles; and
displaying the plurality of bubbles on a display.

The incompressible Navier-Stokes equations may be given by a momentum conservation equation $$u_t + (u \cdot \nabla)u + \nabla p/\rho = \nabla \cdot (\mu \nabla u)/\rho + f/\rho \quad (1)$$

and the mass conservation equation $$\nabla \cdot u = 0, \quad (2)$$

where $u, p, \rho, \mu$, and $f$ represent the velocity, pressure, density, viscosity, and external force, respectively.

The method may further comprise a step of capturing and tracking the gas-liquid interface, which defines signed-distance function $\phi$ such that $|\nabla\phi|=1$ for all domains and the interface is defined at $\phi=0$, wherein a region of $\phi<0$ may be defined as a liquid and $\phi>0$ as a gas.

The step of converting may comprise a step of encoding volume information of media into the fraction field, which is a spatial average of each medium as a continuum, and wherein information from both level set and bubble particles may be transferred to the fraction field, so that the global dynamics of the liquid, large level set bubbles, and microscale bubbles are computed in a single framework.

The Heaviside function may be given as $$H(\phi) = \begin{cases} 0 & \phi < -\epsilon, \\ \frac{1}{2} + \frac{\phi}{2\epsilon} + \frac{1}{2\pi}\sin\left(\frac{\pi\phi}{\epsilon}\right) & -\epsilon \leq \phi \leq \epsilon, \\ 1 & \epsilon < \phi. \end{cases} \quad (3)$$

wherein $\epsilon$ may be selected to commensurate to h, a size of the grid cell. In an embodiment of the invention, $\epsilon$ may be 1.5 h.

The step of converting may comprise a step of adding contribution of bubble particles using an intermediate fraction field $f\phi=H(\phi)$, wherein the fraction field for a grid cell may be computed as:

$$f_{cell} = f_{cell}^\phi - \sum_{i \in cell} \frac{4\pi}{3}(r_i/h)^3, \quad (4)$$

where $r_i$ is the radius of particle i in a grid cell.

The pressure Poisson equation may be given by $$\nabla \cdot (\nabla p^*/\rho) = \nabla \cdot u, \quad (5)$$

which results from the momentum conservation equation and the mass conservation equation.

The step of discretizing may comprise a step of discretizing as $$\sum_{faces} (p_a^* - p_b^*)/\rho_{face} = \sum_{faces} u_{face} \cdot n_{face} \quad (6)$$

where $p^* = \Delta tp$, $\Sigma_{face}$ is a summation for the surrounding faces between cell a and its neighboring cells b, and $n_{face}$ is the cell-face normal.

The density at the face, $\rho_{face}$, may be computed using the fraction field, $$\rho_{face} = \rho_{gas} + (\rho_{liquid} - \rho_{gas})f_{face}. \quad (7)$$

The step of modeling bubble-bubble interactions and determining a direction may comprise a step of defining a probability function over space where the scattering of a bubble might occur as $$s(x) = v\rho_{gas}[1-f(x)]|u(x)|^2, \quad (8)$$

where $v$ is the user-specified scattering frequency and $1-f$ is the fraction of gas.

The step of modeling bubble-bubble interactions and determining a direction may further comprise a step of, for each particle/measuring s(x) after updating the average particle velocity.

The Schlick's phase function for tracing massless particles in participating media may be given as:

$$\cos\theta = (2\xi + k - 1)/(2k\xi - k + 1) \quad (9)$$

where $\theta, \xi \in [0,1]$, and $k \in [-1,1]$ represent the altered direction (in radian), a uniform random number, and the scattering coefficient, respectively.

k=0 may give isotropic scattering, k>0 is forward scattering, and k<0 is backward scattering.

The advantages of the present invention are: (1) the method approximates average motion of bubbles using a continuum multiphase solver; and (2) the method computes subgrid interactions of bubbles using stochastic solver.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein.

DETAILED DESCRIPTION EMBODIMENTS OF THE INVENTION

1. Introduction

Figure 1:
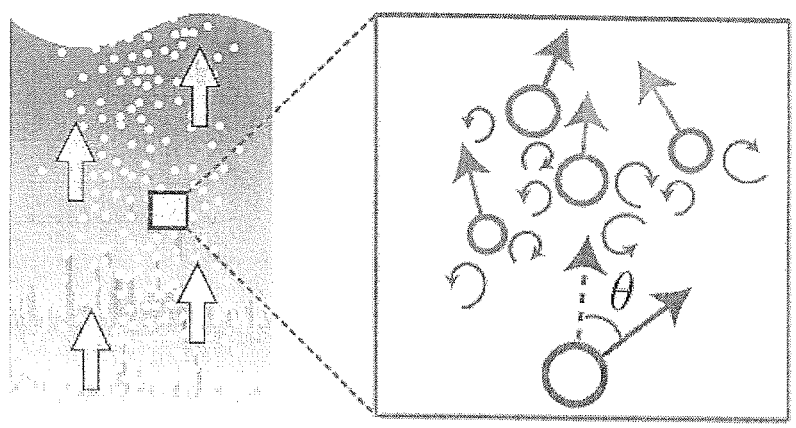
FIG. 1 is a diagram showing a dynamics of dispersed bubble flow.

Attractive underwater scenes always contain bubbles. Especially, viewers are fascinated by the interesting movements of multitudes of small bubbles rising through the water. At the macroscopic level, the global tendency of bubble movements roughly corresponds to our intuitions about fluid dynamics, such as buoyancy, swirl, and diffusion. At the microscopic level, however, each bubble is dispersed in a chaotic and unpredictable manner. Such microscopic flow patterns, in which numerous small bubbles are distributed in the two-phase flow regime, is called dispersed bubble flow. The chaotic motion and complexity of this bubble distribution makes numerical simulation of dispersed bubble flow very challenging.

Small numbers of bubbles can be simulated by multiphase fluid solvers combined with a Eulerian surface tracking framework, and various such methods have been introduced to the computer graphics community [Hong and Kim 2003; Hong and Kim 2005; Song et al. 2005; Zheng et al. 2006; Kim et al. 2007]. However, the methods developed to date have focused on handling relatively large bubbles due to the numerical limitations of grid-based solvers.

Alternatively, particle-particle interaction models for simulating thousands of small bubbles have also been presented [Muller et al. 2005; Cleary et al. 2007; Hong et al. 2008; Mihalef et al. 2009]. However, simulation of millions of dispersed bubbles using these models is impractical, as it requires the direct computation of the interactions among vast collections of particles. The impracticality of these models is not just a matter of computation time, but also of system stability.

As a means of reducing the computational burden, a multilayering framework has become prevalent in recent movies with special effects [Geiger et al. 2006]. In this framework, multiple particle layers are added for dispersed droplet effects such as spray, mist, and white-foam. The movements of these droplets are so simple that they can be controlled by artists in a manual (or pseudo-physical) way.

However, the movements of the dispersed bubbles are affected by bubble-bubble and bubble-liquid interactions, making them too complicated to be mimicked by artists. In this disclosure, we present a new framework for realistically and efficiently simulating dispersed bubble flow. As mentioned above, the most challenging aspect of simulating such flows is the computation of the individual interactions among large numbers of particles and the integration of physical contributions from subgrid bubble structures into the fluid solver. Given that, at present, reproducing such a situation using direct simulation of governing equations is not practically feasible, in this work we take a spatial averaging and stochastic approach. Instead of computing the discrete boundary condition of two different media explicitly, we model the average motion of the dispersed region of bubble flow as a continuum. Based on a grid-based solver, the overall bubble-bubble and bubble-liquid interactions can be solved using this continuum model. Also, to simulate the complex interactions among bubbles, we introduce a new stochastic approach for simulating the subgrid dynamics of bubbles. By separating the computation into two stages, the global motion of bubbles can be effectively solved using the continuum solver, while still maintaining the visual complexity of dispersed bubble flow by means of the stochastic solver.

2. Previous Work

Hong and Kim [2003] introduced the volume-of-fluid method (VOF) [Hirt and Nichols 1981] to simulate bubble dynamics. Subsequently, Hong and Kim [2005] adopted the ghost fluid method [Kang et al. 2000] to capture the discontinuity of physical properties across the bubble-liquid interface. Song et al. [2005] presented a two-phase fluid solver for simulating systems containing both gas and liquid phases. Mihalef et al. [2006] simulated boiling water by applying a two-phase version of the coupled level set and volume-of-fluid (CLSVOF) method of [Sussman 2003], and Kim and Carlson also proposed simple boiling framework [2007]. Zheng et al. [2006] developed a regional level set method to capture the very thin interfaces of bubbles, and Kim et al. [2007] extended this work by introducing a volume control method for bubbles and foams. Alternatively, based on smoothed particle hydrodynamics (SPH) [Monaghan 1992], Muller et al. [2005] developed a two-phase fluid solver and Cleary et al. [2007] devised a simulation method for bubbling and frothing liquids. These methods mainly focus on the dynamics of large bubbles or gas-liquid interfaces.

To capture motion of bubbles whose diameters are much smaller than the grid resolution, particle models have been applied to the grid solver. Based on the particle level set method [Enright et al. 2002], Greenwood and House [2004] changed escaped particles into small bubbles. Hong et al. extended this hybrid framework by designing SPH-based dynamics for escaped bubble particles. Similarly, Thurey et al. [2007] coupled SPH bubbles to a shallow water framework, and Mihalef et al. [2009] incorporated a particle model into a grid-based simulator using the marker level set. However, none of these methods was applied to dispersed bubble flows including millions of small bubbles.

3. The Method

To couple dispersed bubbles with a conventional gas-liquid solver, the gas and liquid volumes are represented by a level set surface, and the dispersed bubbles are represented by spherical particles. In this section, we first review the basic fluid solver, then describe how to compute the average motion of a flow, and finally present the subgrid bubble dynamics solver.

3.1 Basic Fluid Solver

In this disclosure, we assume viscous incompressible two-phase flow when modeling the gas-liquid dynamics. The incompressible Navier-Stokes equations are given by the momentum conservation equation $$u_t + (u \cdot \nabla)u + \nabla p/\rho = \nabla \cdot (\mu \nabla u)/\rho + f/\rho \qquad (1)$$

and the mass conservation equation $$\nabla \cdot u = 0,$$

where u, p, ρ, μ, and f represent the velocity, pressure, density, viscosity, and external force, respectively. We solve the above equations using the stable fluids framework of Stam [1999]. In addition, we used the level set method [Osher and Fedkiw 2002] to capture and track the gas-liquid interface, which defines signed-distance function ϕ such that |∇ϕ|=1 for all domains and the interface is defined at ϕ=0. Also, we define the region of ϕ<0 as a liquid, and ϕ>0 as a gas.

3.2 Simulating Dispersed Flow as a Continuum

When a liquid and gas are in contact, they are separated by a clear interface. This discontinuity generates complex hydrodynamics [Hong and Kim 2005]. For a dispersed flow, however, the length scale of the interface shape is much smaller than the grid size. Therefore, instead of computing the discrete boundary condition of two different media explicitly, we encode volume information of the media into a fraction field, which is a spatial average of each medium as a continuum. Here, information from both level set and bubble particles is transferred to the fraction field, so that the global dynamics of the liquid, large level set bubbles, and microscale bubbles can be computed in a single framework.

First, we show how to compute liquid fraction field f, and utilize this information to couple small bubble particles with liquid or large bubbles. To convert the level set field to a fraction field, we use f$\phi$=H($\phi$), where H is a Heaviside (step) function. Here, we use a smoothed Heaviside function, which can be written as, $$H(\phi) = \begin{cases} 0 & \phi < -\epsilon, \\ \frac{1}{2} + \frac{\phi}{2\epsilon} + \frac{1}{2\pi}\sin\left(\frac{\pi\phi}{\epsilon}\right) & -\epsilon \leq \phi \leq \epsilon, \\ 1 & \epsilon < \phi. \end{cases} \quad (3)$$

We employed $\epsilon$=1.5 h, where h is size of the grid cell. Using this intermediate fraction field f$\phi$, the contribution of bubble particles is added. We can write this in the following simple equation:

$$f_{cell} = f_{cell}^{\phi} - \sum_{i \in cell} \frac{4\pi}{3}(r_i/h)^3, \quad (4)$$

where ri is the radius of particle i in a grid cell. After computation of fraction field f, a pressure Poisson equation $$\nabla \cdot (\nabla p^*/\rho) = \nabla \cdot u, \quad (5)$$

which results from equations 1 and 2, can be discretized as follows $$\sum_{faces}(p_a^* - p_b^*)/\rho_{face} = \sum_{faces} u_{face} \cdot n_{face} \quad (6)$$

where p*=$\Delta$tp, $\Sigma_{face}$ is the summation for the surrounding faces between cell a and its neighboring cells b, and nface is the cell-face normal. Here, the density at the face, pface, can be computed as follows using the fraction field, $$\rho_{face} = \rho_{gas} + (\rho_{liquid} - \rho_{gas})f_{face}. \quad (7)$$

The same approach can be easily applied to compute $\mu_{face}$ in a Poisson equation from implicit integration of the diffusion equation. After computing the pressure and viscosity, the bubble particles are advected according to the velocity field.

This fractional density/viscosity formulation naturally generates buoyancy and swirl fields in the cells of dispersed bubbles. Instead of our formulation, a sophisticated approach such as the two-fluid model [Ishii 1975], which analyzes two-phase flow as two separated fluid layers, may be applied. However, such models incur a greater computational cost because most of the governing equations must be computed twice, and require twice as much memory to store two fluid layers. Also, the relative motion between bubbles and liquid in a dispersed flow is much smaller than in bubbly flows with fewer and larger bubbles [Trafalis et al. 2005]. Thus, it is more efficient to model dispersed flows as a single averaged velocity field.

3.3 Stochastic Solver for Subgrid Bubble Dynamics

Each rising bubble creates a wake that affects other bubbles (including itself), giving rise to complicated hydrodynamics. Although it is theoretically possible to accurately capture the vortices generated by each bubble, this approach is impractical when attempting to simulate huge numbers of microscale bubbles.

Instead, we model this phenomenon as a discrete random walk. As shown in FIG. 1, a bubble particle is scattered due to the turbulent flow generated by other bubbles. Thus, when a bubble particle approaches other, sparsely distributed bubbles, it may be scattered by those bubbles, or it may be unaffected and move freely to another position. To model this process, let s(x) be the probability function over space where the scattering of a bubble might occur. Here, we define this function as $$s(x) = \nu \rho_{gas}[1-f(x)]|u(x)|^2, \quad (8)$$

where $\nu$ is the user-specified scattering frequency and 1−f is the fraction of gas. Similarly to Brownian motion, which results from the combined effects of intra- and intermolecular interactions, the velocity u is squared to reflect the kinetic energy density of bubbles ($\rho_{gas}[1-f(x)]|u(x)|2$). By this definition, more scattering events will occur when the concentration of bubbles and the magnitudes of their velocities are high. For each particle, we measure s(x) after updating the average particle velocity (described in the previous section). If a certain particle is determined to be scattered, the direction of that particle's velocity is altered. Since the volume of the individual particle is relatively smaller than the volume of a grid cell, the particle's new direction can be calculated using Schlick's phase function [Blasi et al. 1993] for tracing massless particles in participating media, which can be expressed as, $$\cos \theta = (2\xi + k - 1)/(2k\xi - k + 1) \quad (9)$$

where $\theta$, $\xi \in [0, 1]$, and $k \in [-1, 1]$ represent the altered direction (in radian), a uniform random number, and the scattering coefficient, respectively. Here, k=0 gives isotropic scattering, k>0 is forward scattering, and k<0 is backward scattering. The Schlick phase function, which is an approximation of the empirical Henyey-Greenstein phase function, determines the direction of particle after particle-dust collision event based on the distribution of dust. We adopted this function and reinterpreted it to determine the direction of bubble after bubble-turbulent vorticities collision event based on the distribution of bubbles (sources of the turbulent vorticities).

Figure 2:
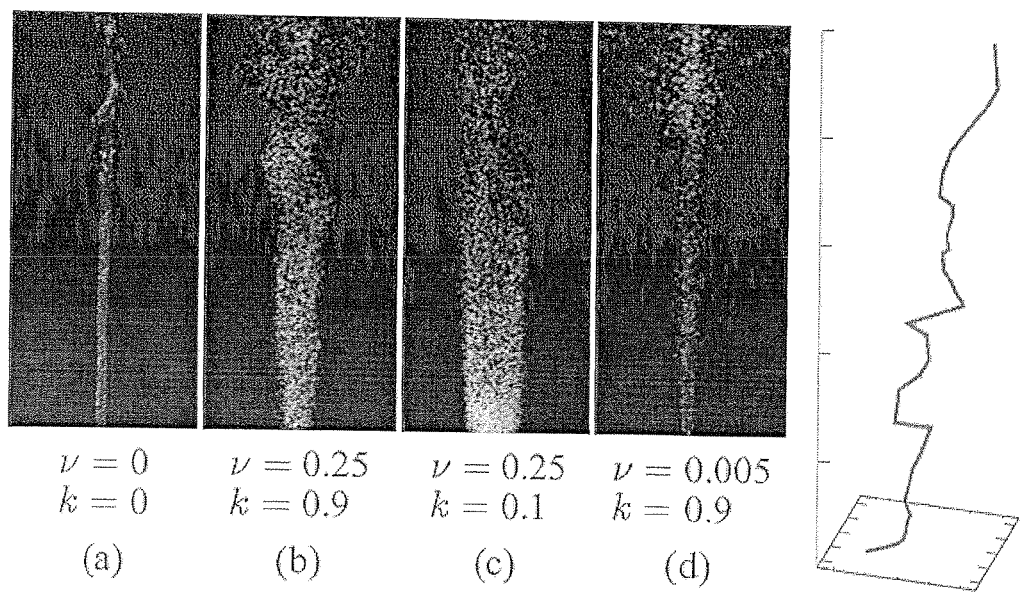
FIG. 2 is a diagram showing simulation of rising bubbles according to the invention.

Of course, the Schlick function (equation 9) was not originally invented for computing diffusion process of suspended particles under turbulence flow. In the aspect of computational fluid dynamics (CFD), it could be right to introduce stochastic differential equations (SDE) [Kloeden and Platen 1992; Yuu et al. 1978], such as Langevin equation or Fokker-Plank equation to solve accurate distribution of particles. In our simulation, however, each bubble is very light compared to the surrounding liquid, and is reasonable to compute its path with mass-less particle tracer—the Schlick function. Most of all, the Schlick phase function can be easily controlled by artists with intuitive parameters, and it is also very simple to be implemented. Thus, as shown in FIG. 2, it can produce various kinds of visual effects without struggling with complex physical parameters. After solving equation 9, momentum of each bubble should be transferred to grids. This process is computed be defining scattering force $m_i^-$ $(u_i^{altered} - {}^-u_i)/\Delta t$, which can be applied to the cell containing particle i, as an external force f of equation 1. Here, $mi = \rho gas$ $(4\pi/3)r3$ i is the mass of particle i. FIG. 2 shows the results obtained using various values of v and k. Note that simulations with large v or small k exhibit diffusive characteristics. Solving equation 8 and 9 is similar to simulating Brownian motion, which describes the molecular motion of diffusion processes. Thus, it is natural that v and k control the diffusiveness of the particle distribution. In addition, examination of the trajectory of a single bubble (FIG. 2) reveals zig-zag and spiral oscillatory motions, thus demonstrating that our method can reproduce a bubble path instability [Shew and Pinton 2006; Hassan et al. 2008].

3.4 Break-Up of Bubbles

To simulate break-up events of microscale bubbles, we adopt Kolmogorov's concept of viewing solid particle breakup as a discrete random process [Kolmogorov 1949]. For each particle, a random number $\xi \in [0, 1]$ is compared to a user-specified break-up frequency $\gamma$. If $\xi$ is smaller than $\gamma$, the bubble particle is broken into two particles, each half the volume of the initial particle (radius of $1/^3\sqrt{2}$), and the resulting particles are scattered using equation 9.

4. Results

All experiments reported here were performed on an Intel Core i7 920 2.66 GHz processor with 6 GB of memory. We used a uniform regular staggered grid for discretization. For computing the advection term in equation 1, we used the unsplit semi-Lagrangian CIP method [Kim et al. 2008]. Also, our solver is parallelized using OpenMP library. We used 8 threads with full 4 cores with hyperthreading enabled (×2 threads) for the computation, which is the default setting using OpenMP in Intel Core i7 920. Each part of the simulator shows different scale-up factor: our multigrid solver did not show good scalability performance, while the advection and level set solver have shown relatively good performance. It depends on the scene complexity, but multigrid solver took more than 60% of the total computation time for most of the experiments. Updating bubbles step was easily parallelized, except for the accumulation step, which converts bubbles to the fraction field (since it requires critical section to protect from race conditions). For all of our experiments, we used 1.25 kg/m3 for $\rho gas$, 1000 kg/m3 for $\rho liquid$, $2.0 \times 10^{-5}$ kg/ms for $\mu gas$, $1.0 \times 10^{-3}$ kg/ms for $\mu liquid$, 0.25 for v, 0.9 for k, and $10^{-4}$ for $\gamma$.

In an experiment, a simulation of bubbles generated around hot objects was performed. In the experiment, we did not simulated boiling as shown in [Mihalef et al. 2006], but just simply emitted bubbles from randomly sampled points on the object's surface. The simulation was carried out using a 192× 256×128 grid with a maximum of approximately 1,160,00 particles. Approximately 15 seconds were required to advance a single animation frame (1/30 seconds).

A simulation of bubbles generated around a melting bunny-shaped object has been performed. This animation of melting was created heuristically by subtracting a constant value from the level set field of the bunny model. The simulation was carried out using a 160×192×96 grid with a maximum of approximately 1,570,000 particles. The simulation took only about 7 seconds to advance a single animation frame.

In another experiment, we assess the quality of our simulation by comparing the results with video taken from a real-world experiment. When a bubble agent is placed at the bottom of a water tank, a massive number of microscale bubbles are generated from the agent's surface. Although the individual path of each bubble is clearly different, the overall motion of the simulated bubbles qualitatively resembles the real bubble motions. Both the simulated and real systems show an unstable rising pattern of bubbles and smoke-like diffusion after reaching the water surface. The simulation was carried out using a 803 grid with a maximum of approximately 2,600,000 particles. The simulation took about 16 seconds per single animation frame.

5. Conclusion

In this disclosure, a simple and fast method for simulating dispersed bubble flow was disclosed. To simulate a large set of bubbles, the direct numerical solver is separated into two stages. First, instead of computing the discrete boundary condition between gas and liquid, a spatial averaging approach is taken to interpret dispersed bubble flow as a continuum. Then, the subgrid interactions among bubbles were calculated using our new stochastic solver. As a result, complex scenes with millions of microscale bubbles may be simulated in less than 16 seconds per frame on a single PC.

Our limitation mainly comes from the approximation of bubble dynamics, which does not correctly handle per-bubble collision, merging, shape variation, and overlapping problem. In order to avoid this kind of problems, one should perform proximity test or collision detection between large set of bubbles. Without the consideration of direct interaction between bubbles, sometimes they will get overlapped, or introduce such kind of artifacts. However, performing per-bubble interaction will eventually reduce the performance of the solver. Thus, bubble interaction by accumulating them may be approximated into the fraction field.

Future extensions of our method include simulation of other kinds of particulate flow, which involves dust or sand, and simulation of mixed water sprays and bubbles, which can be observed from waterfalls or breaking waves.

Figure 3:
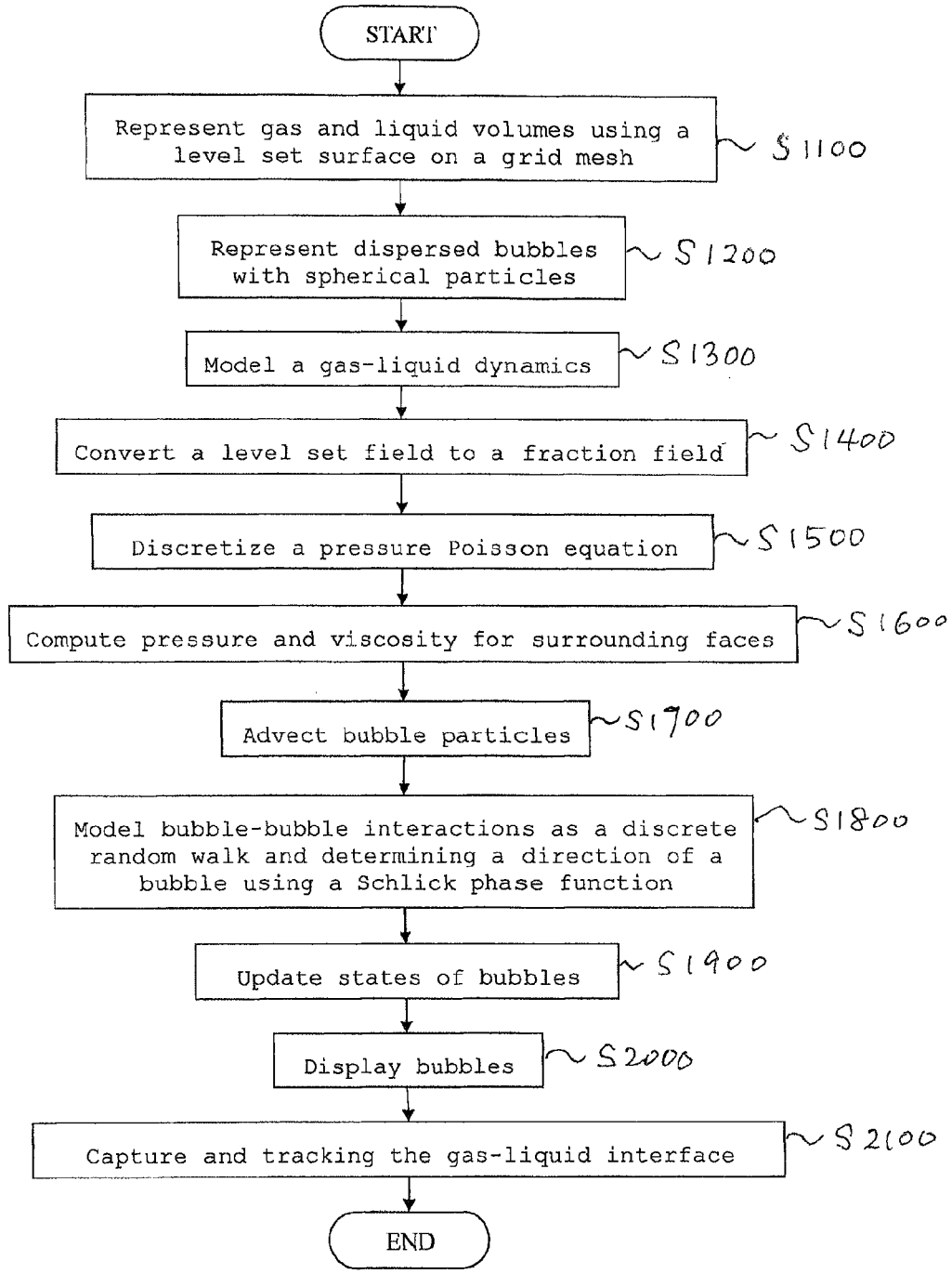
FIG. 3 a flow-chart showing a method for simulating dispersed bubble flow.

FIG. 1 is a diagram showing a dynamics of dispersed bubble flow, and FIG. 2 is a diagram showing simulation of rising bubbles according to the invention. FIG. 3 a flow-chart showing a method for simulating dispersed bubble flow according to an embodiment of the invention.

An aspect of the invention provides a method for simulating dispersed bubble flow.

The method comprises steps of:

representing gas and liquid volumes using a level set surface on a grid mesh comprising a plurality of cells (S1100);

representing a plurality of dispersed bubbles with a plurality of spherical particles (S1200);

modeling a gas-liquid dynamics by assuming viscous incompressible two-phase flow, wherein the gas-liquid dynamics is governed by an incompressible Navier-Stokes equation and a mass conservation equation (S1300);

converting a level set field to a fraction field using a Heaviside function (S1400);

discretizing a pressure Poisson equation (S1500);

computing pressure and viscosity for surrounding faces between two neighboring grid cells (S1600);

advecting bubble particles according to velocity field (S1700);

modeling bubble-bubble interactions as a discrete random walk and determining a direction of a bubble using a Schlick phase function (S1800);

updating states of the plurality of bubbles (S1900); and displaying the plurality of bubbles on a display (S2000).

The incompressible Navier-Stokes equations may be given by a momentum conservation equation $$u_t + (u \cdot \nabla)u + \nabla p/\rho = \nabla \cdot (\mu \nabla u)/\rho + f/\rho \qquad (1)$$

and the mass conservation equation $$\nabla \cdot u = 0, \qquad (2)$$

where u, p, ρ, μ, and f represent the velocity, pressure, density, viscosity, and external force, respectively.

The method may further comprise a step of capturing and tracking the gas-liquid interface, which defines signed-distance function φ such that |∇φ|=1 for all domains and the interface is defined at φ=0, wherein a region of φ<0 may be defined as a liquid and φ>0 as a gas (S2100).

The step (S1400) of converting may comprise a step of encoding volume information of media into the fraction field, which is a spatial average of each medium as a continuum, and wherein information from both level set and bubble particles may be transferred to the fraction field, so that the global dynamics of the liquid, large level set bubbles, and microscale bubbles are computed in a single framework.

The Heaviside function may be given as $$H(\phi) = \begin{cases} 0 & \phi < -\epsilon, \\ \frac{1}{2} + \frac{\phi}{2\epsilon} + \frac{1}{2\pi}\sin\left(\frac{\pi\phi}{\epsilon}\right) & -\epsilon \leq \phi \leq \epsilon, \\ 1 & \epsilon < \phi. \end{cases} \qquad (3)$$

wherein ε may be selected to commensurate to h, a size of the grid cell. In an embodiment of the invention, ε may be 1.5 h.

The step (S1400) of converting may comprise a step of adding contribution of bubble particles using an intermediate fraction field fφ=H(φ), wherein the fraction field for a grid cell may be computed as:

$$f_{cell} = f_{cell}^{\phi} - \sum_{i \in cell} \frac{4\pi}{3}(r_i/h)^3, \qquad (4)$$

where ri is the radius of particle i in a grid cell.
The pressure Poisson equation may be given by $$\nabla \cdot (\nabla p^*/\rho) = \nabla \cdot u, \qquad (5).$$

which results from the momentum conservation equation and the mass conservation equation.

The step (S1500) of discretizing may comprise a step of discretizing as $$\sum_{faces} (p_a^* - p_b^*)/\rho_{face} = \sum_{faces} u_{face} \cdot n_{face} \qquad (6)$$

where p*=Δtp, $\Sigma_{face}$ is a summation for the surrounding faces between cell a and its neighboring cells b, and $n_{face}$ is the cell-face normal.

The density at the face, $\rho_{face}$, may be computed using the fraction field, $$\rho_{face} = \rho_{gas} + (\rho_{liquid} - \rho_{gas})f_{face}. \qquad (7)$$

The step (S1800) of modeling bubble-bubble interactions and determining a direction may comprise a step of defining a probability function over space where the scattering of a bubble might occur as $$s(x) = v\rho_{gas}[1 - f^*(x)]|u(x)|^2, \qquad (8)$$

where v is the user-specified scattering frequency and 1−f is the fraction of gas.

The step (S1800) of modeling bubble-bubble interactions and determining a direction may further comprise a step of, for each particle, measuring s(x) after updating the average particle velocity.

The Schlick's phase function for tracing massless particles in participating media may be given as:

$$\cos\theta = (2\xi + k - 1)/(2k\xi - k + 1) \qquad (9)$$

where θ, ξ∈[0, 1], and k∈[−1, 1] represent the altered direction (in radian), a uniform random number, and the scattering coefficient, respectively.

k=0 may give isotropic scattering, k>0 is forward scattering, and k<0 is backward scattering.

While the invention has been shown and described with reference to different embodiments thereof, it will be appreciated by those skilled in the art that variations in form, detail, compositions and operation may be made without departing from the spirit and scope of the invention as defined by the accompanying claims.

REFERENCES

BLASI, P., SAEC, B. L., AND SCHLICK, C. 1993. A rendering algorithm for discrete volume density objects. Comput. Graph. Forum 12, 3, 201-210.

CLEARY, P. W., PYO, S. H., PRAKASH, M., AND KOO, B. K. 2007. Bubbling and frothing liquids. ACM Trans. Graph. 26, 3, 97

ENRIGHT, D., MARSCHNER, S., AND FEDKIW, R. 2002. Animation and rendering of complex water surfaces. ACM Trans. Graph. 21, 3, 736-744.

GEIGER, W., LEO, M., RASMUSSEN, N., LOSASSO, F., AND FEDKIW, R. 2006. So real it'll make you wet. In ACM SIGGRAPH 2006 Sketches, 20.

GREENWOOD, S. T., AND HOUSE, D. H. 2004. Better with bubbles: enhancing the visual realism of simulated fluid. In Proceedings of the 2004 ACM SIGGRAPH/Eurographics symposium on Computer animation, 287-296.

HASSAN, N. M. S., KHAN, M. M. K., AND RASUL, M. G. 2008. a study of bubble trajectory and drag co-efficient in water and non-newtonian fluids. WSEAS Transactions on Fluid Mechanics 3, 3, 261-270.

HIRT, C. W., AND NICHOLS, B. D. 1981. Volume of fluid (vof) method for the dynamics of free boundaries. J. Comp. Phys. 39, 1, 201-255.

HONG, J.-M., AND KIM, C.-H. 2003. Animation of bubbles in liquid. Comput. Graph. Forum 22, 3, 253-262.

HONG, J.-M., AND KIM, C.-H. 2005. Discontinuous fluids. ACM Trans. Graph. 24, 3, 915-920.

HONG, J.-M., LEE, H.-Y., YOON, J.-C., AND KIM, C.-H. 2008. Bubbles alive. ACM Trans. Graph. 27, 3, 48.

ISHII, M. 1975. Thermo-Fluid Dynamic Theory of Two-Phase Flow. Eyrolles, Paris.

KANG, M., FEDKIW, R. P., AND LIU, X.-D. 2000. A boundary condition capturing method for multiphase incompressible flow. J. Sci. Comput. 15, 3, 323-360.

KIM, T., AND CARLSON, M. 2007. A simple boiling module. In Proceedings of the 2007 ACM SIGGRAPH/Eurographics symposium on Computer animation, Eurographics Association, Airela-Ville, Switzerland, Switzerland, 27-34.

KIM, B., LIU, Y., LLAMAS, I., JIAO, X., AND ROSSIGNAC, J. 2007. Simulation of bubbles in foam with the volume control method. ACM Trans. Graph. 26, 3, 98.

KIM, D., SONG, O.-Y., AND KO, H.-S. 2008. A semi-lagrangian cip fluid solver without dimensional splitting. Comput. Graph. Forum 27, 2, 467-475.

KLOEDEN, P. E., AND PLATEN, E. 1992. Numerical solution of stochastic differential equations. Springer-Verlag, Berlin Heidelberg New York.

KOLMOGOROV, A. N. 1949. On the fragmentation of drops in turbulent streams. Dokl. Akad. Nauk SSSR 66, 825-828.

MIHALEF, V., UNLUSU, B., METAXAS, D., SUSSMAN, M., AND HUSSAINI, M. Y. 2006. Physics based boiling simulation. In Proceedings of the 2006 ACM SIGGRAPH/Eurographics symposium on Computer animation, 317-324.

MIHALEF, V., METAXAS, D., AND SUSSMAN, M. 2009. Simulation of two-phase flow with sub-scale droplet and bubble effects. Comput. Graph. Forum 28, 2, 229-238.

MONAGHAN, J. 1992. Smoothed particle hydrodynamics. Ann. Rev. Astron. Astrophys. 30, 543-74.

MULLER, M., SOLENTHALER, B., KEISER, R., AND GROSS, M. 2005. Particle-based fluid-fluid interaction. In Proceedings of the 2005 ACM SIGGRAPH/Eurographics symposium on Computer animation, 237-244.

OSHER, S., AND FEDKIW, R. 2002. The Level Set Method and Dynamic Implicit Surfaces. Springer-Verlag, New York.

SHEW, W. L., AND PINTON, J.-F. 2006. Dynamical model of bubble path instability. Phys. Rev. Lett. 97, 144508.

SONG, O.-Y., SHIN, H., AND KO, H.-S. 2005. Stable but nondissipative water. ACM Trans. Graph. 24, 1, 81-97.

STAN, J. 1999. Stable fluids. Computer Graphics (Proc. ACM SIGGRAPH '99) 33, Annual Conference Series, 121-128.

SUSSMAN, M. 2003. A second order coupled levelset and volume of fluid method for computing growth and collapse of vapor bubbles. J. Comp. Phys. 187, 1, 110-136.

THUREY, N., SADLO, F., SCHIRM, S., MULLER-FISCHER, M., AND GROSS, M. 2007. Real-time simulations of bubbles and foam within a shallow water framework. In Proceedings of the 2007 ACM SIGGRAPH/Eurographics symposium on Computer animation, 191-198.

TRAFALIS, T. B., OLADUNNI, O., AND PAPAVASSILIOU, D. V. 2005. Two-phase flow regime identification with a multiclassification support vector machine (svm) model. Ind. Eng. Chem. Res. 44, 12, 4414-4426.

YUU, S., YASUKOUCHI, N., HIROSAWA, Y., AND JOTAKI, T. 1978. Particle turbulent diffusion in a dust laden round jet. AIChE Journal 24, 509-519.

ZHENG, W., YONG, J.-H., AND PAUL, J.-C. 2006. Simulation of bubbles. In Proceedings of the 2006 ACM SIGGRAPH/Eurographics symposium on Computer animation, 325-333.

What is claimed is:

1. A method for simulating dispersed bubble flow, the method comprising steps of:
representing gas and liquid volumes using a level set surface on a grid mesh comprising a plurality of grid cells;
representing a plurality of dispersed bubbles with a plurality of spherical particles in the grid mesh;
modeling a gas-liquid dynamics of the plurality of dispersed bubbles of the gas and liquid volumes by assuming viscous incompressible two-phase flow, wherein the gas-liquid dynamics is governed by an incompressible Navier-Stokes equation and a mass conservation equation;
converting information from both a level set for capturing and tracking a gas-liquid interface and the plurality of dispersed bubbles to a fraction field using a Heaviside function;
discretizing a pressure Poisson equation resulting from the incompressible Navier-Stokes equation and the mass conservation equation;
computing pressure and viscosity for surrounding faces between two neighboring grid cells of the plurality of grid cells across the grid mesh;
advecting the plurality of dispersed bubble particles according to velocity field;
modeling bubble-bubble interactions as a discrete random walk and determining a direction of a bubble using a Schlick phase function;
updating states of the plurality of bubbles; and
displaying the plurality of bubbles on a display.

2. The method of claim 1, wherein the incompressible Navier-Stokes equations are given by a momentum conservation equation $$u_t + (u \cdot \nabla)u + \nabla p/\rho = \nabla \cdot (\mu \nabla u)/\rho + f/\rho \quad (1)$$

and the mass conservation equation $$\nabla \cdot u = 0, \quad (2)$$

where u, p, $\rho$, $\mu$, and f represent velocity, pressure, density, viscosity, and external force, respectively.

3. The method of claim 2, further comprising a step of capturing and tracking the gas-liquid interface, which defines signed-distance function $\phi$ such that $|\nabla \phi|=1$ for all domains and the interface is defined at $\phi=0$, wherein a region of $\phi<0$ is defined as a liquid and $\phi>0$ as a gas, wherein the step of capturing the gas-liquid interface comprises a step of finding out where signed-distance function $\phi$ is zero.

4. The method of claim 2, wherein the step of converting comprises a step of encoding volume information of media into the fraction field, which is a spatial average of each medium as a continuum, and wherein information from both level set and bubble particles is transferred to the fraction field, so that a global dynamics of a liquid, level set bubbles, and bubbles represented with the plurality of spherical particles are computed.

5. The method of claim 4, wherein the Heaviside function is given as $$H(\phi) = \begin{cases} 0 & \phi < -\epsilon, \\ \frac{1}{2} + \frac{\phi}{2\epsilon} + \frac{1}{2\pi}\sin\left(\frac{\pi\phi}{\epsilon}\right) & -\epsilon \le \phi \le \epsilon, \\ 1 & \epsilon < \phi. \end{cases} \quad (3)$$

wherein $\epsilon$ is selected to commensurate to a size of a grid cell, h.

6. The method of claim 5, wherein $\epsilon$ is 1.5 h.

7. The method of claim 5, wherein the step of converting comprises a step of adding contribution of bubble particles using an intermediate fraction field $f\phi = H(\phi)$, wherein the fraction field for a grid cell is computed as:

$$f_{cell} = f^\phi_{cell} - \sum_{i \in cell} \frac{4\pi}{3}(r_i/h)^3, \quad (4)$$

where $r_i$ is a radius of particle i in a grid cell.

8. The method of claim 7, wherein the pressure Poisson equation is given by $$\nabla \cdot (\nabla p^*/\rho) = \nabla \cdot u, \quad (5)$$

which results from the momentum conservation equation and the mass conservation equation.

9. The method of claim 8, wherein the step of discretizing comprises a step of discretizing as $$\sum_{faces} (p_a^* - p_b^*)/\rho_{face} = \sum_{faces} u_{face} \cdot n_{face} \quad (6)$$

where $p^* = \Delta tp$, $\Sigma_{face}$ is a summation for surrounding faces between cell a and its neighboring cells b, and $n_{face}$ is a cell-face normal.

10. The method of claim 9, wherein the density at a face, $\rho_{face}$, is computed using the fraction field, $$\rho_{face} = \rho_{gas} + (\rho_{liquid} - \rho_{gas}) f_{face}. \quad (7)$$

11. The method of claim 2, wherein the step of modeling bubble-bubble interactions and determining a direction of an interacted bubble comprises a step of defining a probability function over space where a scattering of a bubble might occur as $$s(x) = \nu \rho_{gas} [1 - f(x)] |u(x)|^2, \quad (8)$$

where $\nu$ is a user-specified scattering frequency and $1-f$ is a fraction of gas.

12. The method of claim 11, wherein the step of modeling bubble-bubble interactions and determining a direction of an interacted bubble further comprises a step of, for each particle, measuring s(x) after updating an average particle velocity.

13. The method of claim 12, wherein the Schlick's phase function for tracing massless particles in participating media is given as:

$$\cos \theta = (2\xi + k - 1)/(2k\xi - k + 1) \quad (9)$$

where $\theta, \xi \in [0, 1]$, and $k \in [-1, 1]$ represent the altered direction (in radian), a uniform random number, and the scattering coefficient, respectively.

* * * * *